(12) United States Patent
McColgan et al.

(10) Patent No.: US 8,578,451 B2
(45) Date of Patent: Nov. 5, 2013

(54) SYSTEM AND METHOD FOR ENCAPSULATION OF APPLICATION ASPECTS WITHIN AN APPLICATION INFORMATION DATA FORMAT MESSAGE

(75) Inventors: Brian Edward Anthony McColgan, Mississauga (CA); Gaelle Christine Martin-Cocher, Mississauga (CA)

(73) Assignee: BlackBerry Limited, Waterloo, CA (US)

( * ) Notice: Subject to any disclaimer, the term of this patent is extended or adjusted under 35 U.S.C. 154(b) by 494 days.

(21) Appl. No.: 12/635,988

(22) Filed: Dec. 11, 2009

(65) Prior Publication Data
US 2010/0154036 A1 Jun. 17, 2010

Related U.S. Application Data

(60) Provisional application No. 61/122,052, filed on Dec. 12, 2008.

(51) Int. Cl.
*G06F 7/04* (2006.01)
(52) U.S. Cl.
USPC ............ 726/4; 726/3; 726/5; 726/6; 726/7; 713/165; 713/166; 713/167
(58) Field of Classification Search
USPC ................ 726/4, 47; 709/220, 224
See application file for complete search history.

(56) References Cited

U.S. PATENT DOCUMENTS

| 6,757,722 B2 * | 6/2004 | Leppänen et al. ............ 709/220 |
| 7,302,270 B1 | 11/2007 | Day |
| 2007/0162228 A1 | 7/2007 | Mitchell |
| 2007/0189301 A1 | 8/2007 | Kiss et al. |
| 2008/0313329 A1 * | 12/2008 | Wang et al. .................. 709/224 |

FOREIGN PATENT DOCUMENTS

| CA | 2686811 A1 | 12/2008 |
| CA | 2641084 A1 | 4/2009 |

OTHER PUBLICATIONS

International application No. PCT/CA2009/001789, International Search Report, dated Mar. 22, 2010.
International application No. PCT/CA2009/001789, Written Opinion of the International Searching Authority, dated Mar. 22, 2010.
EP application No. 09831347.1, Extended European Search Report, dated May 30, 2012.
Open Mobile Alliance: "Presence SIMPLE Specification", OMA-TS-PRESENCE_SIMPLE-V2_0-20071128-D, Draft Version 2.0, Nov. 28, 2007, pp. 1-94, XP002634814, Retrieved from the Internet: URL:http://member.openmobilealliance.org/ftp/Public_documents/PAG/Permanent_documents/OMA-TS-Presence_SIMPLE-V2_0-20071128-D.zip [retrieved on Apr. 28, 2011], paras. [05.5], [5.5.3], [5.5.3.2], [10.4]; figure 23.

* cited by examiner

*Primary Examiner* — Longbit Chai
(74) *Attorney, Agent, or Firm* — Moffat & Co.

(57) ABSTRACT

A method and system for processing a data request from a watcher for a target at a server, the method receiving a request for information; searching through a policy for rules to be applied based on the watcher; applying any rules found by the searching, the rule causing a transformation of the information into at least one aspect interpretable by the watcher, the applying utilizing a presence information data format transformation; and returning the at least one aspect incorporated in a presence information data format.

16 Claims, 5 Drawing Sheets

SYSTEM AND METHOD FOR ENCAPSULATION OF APPLICATION ASPECTS WITHIN AN APPLICATION INFORMATION DATA FORMAT MESSAGE

RELATED APPLICATIONS

The present application claims priority from U.S. Application No. 61/122,052, filed Dec. 12, 2008, the contents of which are incorporated herein by reference.

FIELD OF THE DISCLOSURE

The present disclosure relates to provision of aspects to a requesting party and in particular embodiments to presence and location aspect information.

BACKGROUND

Under traditional presence platforms presence information is transported using a presence information data format (PIDF) in traditional SIP/SIMPLE presence. The PIDF format is rigid and set by the internet engineering task force (IETF) standards body.

Communication of presence information data between a watcher and a presence server is verbose. Specifically, raw data is passed to the watcher to allow the watcher to derive various presence aspects. This requires a significant amount of "over the air" traffic.

The use of raw data to derive presence aspects by a watcher, can be problematic since the computation is non-trivial and therefore various watchers can interpret the raw data differently, which can lead to erroneous conclusions on behalf of a watcher client or consumer.

Similar to presence servers, location servers or other generic servers (i.e. generic information servers or data sources) could be configured such that a watcher will derive location or generic aspects from raw data, which causes significant over the air communications and compatibility issues.

BRIEF DESCRIPTION OF THE DRAWINGS

The present disclosure will be better understood with reference to the drawings in which.

DETAILED DESCRIPTION

The present disclosure provides a method for processing a data request from a watcher for a target at a server comprising: receiving a request for information; searching through authorization rules for rules to be applied based on the watcher; applying at least one rule from the searching step relative to the watcher, the rule causing a transformation of the information into at least one aspect interpretable by the watcher, the applying utilizing a presence information data format transformation; and returning the at least one aspect incorporated in a presence information data format.

The present disclosure further provides a network element configured for processing a data request from a watcher for a target, the network element comprising: a processor; and a communication subsystem, the processor and the communication subsystem cooperating for: receiving a request for information; searching through authorization rules for rules to be applied based on the watcher; applying at least one rule from the searching step relative to the watcher, the rule causing a transformation of the information into at least one aspect interpretable by the watcher, the applying utilizing a presence information data format transformation; and returning the at least one aspect incorporated in a presence information data format.

Figure 1:
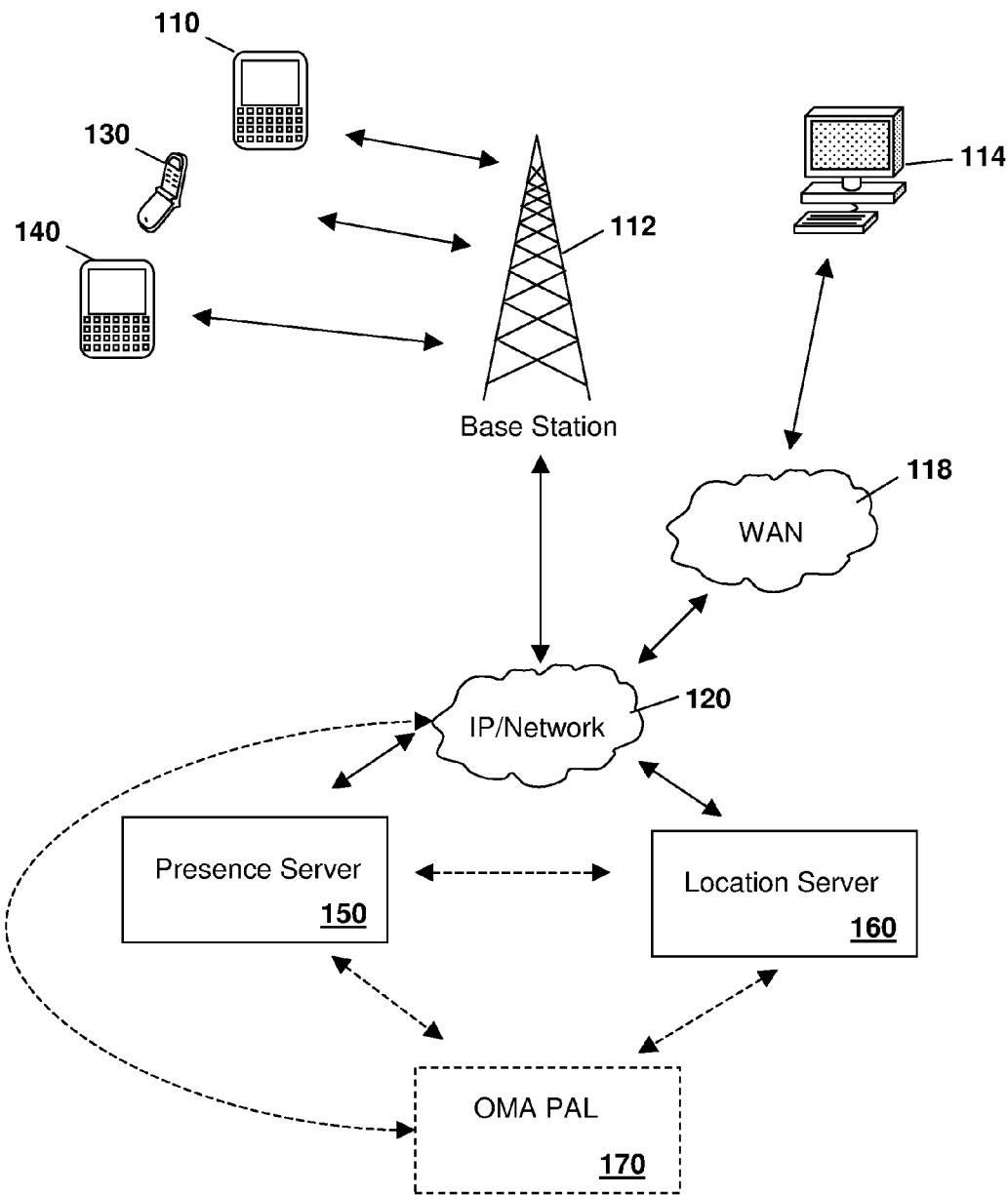
FIG. 1 is a block diagram of an exemplary system including presence and location servers.

Reference is now made to FIG. 1. FIG. 1 shows an exemplary environment for a presence and location system, where aspects are provided to watchers. In general, the system allows an authorized watcher to obtain information about a target. In the particular embodiments of the present disclosure, the information obtained by the watcher is transformed by a server or abstraction layer to ensure consistent information among various watchers and to reduce network communications requirements, as described below.

As used herein, aspects are application level abstractions relevant to a source or service. For example, presence aspects are application level abstractions relevant to presence. In the present disclosure, presence is described as one example of the use of aspects. However, the examples below could equally apply to location or other generic aspects, and the use of presence is not intended to be limiting.

Table 1 below outlines a base set of applicable presence aspects that may be provided to a watcher, and in particular to a client application on the watcher. For each presence aspect, a description is provided, along with the associations the aspect relates to in terms of the standard presence data model outlined in IETF rfc 4479 and rfc 3863.

In particular, to specify and apply contextually relevant behavior across a disparate set of interworking components and user devices, a general mechanism for the encapsulation of aspects related to a presence platform may be provided. That is, an aspect captures a first-order abstraction related to a given application or enabler. Aspects relating to a presence platform would describe or relate to underlying indications of presence. Aspects may be expanded to encapsulate other indications as well. For example, location may be incorporated (or inferred) to derive or compute an associated aspect within a presence platform. This is illustrated in Table 1 below with regard to the "who-is-nearby" aspect.

As will be appreciated by those skilled in the art, Table 1 may be modified or extended to support other presence platforms or application/enabler requirements. The particular presence aspects shown in Table 1 are demonstrative of OMA presence.

| Presence Aspect | Description | Associations | Visibility | Common visibility |
|---|---|---|---|---|
| opt-in | Presentity is willing to participate in a session for a given service or application. | Person -> service. | OTA, Server | Server |

-continued

| Presence Aspect | Description | Associations | Visibility | Common visibility |
|---|---|---|---|---|
| available | Presentity is available to communicate using a given service or application. | Person -> service. | OTA, Server | Server |
| contact-means | Presentities most applicable method of contact for a given service or application. | Person(addr) -> service. | OTA, server | Server |
| contactable | Presentity is willing, available, and has a currently valid contact means for a given service or application. | Person(addr) -> service. | OTA, server | Server |
| reachable | Presentity is contactable for a given Service or application. NOTE: A positive indication for reachable is indicates that a presentity is willing, available, contactable, and their device is in-coverage to establish communication over the defined service. | Person -> service -> device | OTA, server | OTA |
| where-are-you | Presentities current location. | Person, Person -> service -> device | OTA, server | OTA |
| personal-avatar | Presentities current personal iconic representation. | Person | OTA, server | OTA |
| service-avatar | Presentities current iconic representation for a given service or application. | Person -> service | OTA, server | OTA |
| personal-interests | Presentities current interests or hobbies. | Person(extended-info) | OTA, server | Server |
| who-is-subscribing-to-me | Watchers that currently have 'pending' subscriptions for a given presentity. | Winfo | OTA, server | Server |
| who-is-nearby | A list of zero or more presentities that are within close proximity and meet an optional set of criteria (e.g. interested in football). | Person -> service | OTA, server | Either |
| who-is-blocked | Watchers who have had subscriptions terminated or have been blocked for a given presentity | Winfo, common-policy | OTA, server | Server |
| eligible-session-participant | Whether a presentity is reachable and meets an optional set of criteria in order to participate in a session of the associated service. | Person -> service -> device, Shared UserProfile, Other XDMS meta-data | OTA, Server | Server |
| Session-answermode | An indicator of whether a presentity will accept an incoming session for a given service in automatic (no intervention) or manual (user must accept/reject) mode. | Person -> service | OTA, Server | OTA |

Table 1 defines various presence/application/service aspects. For each aspect there is a short description along with the association or applicability of the aspect to the standard presence data model. In addition, the visibility is declared. Visibility describes the applicable point at which the associate aspect is referred to. Common visibility defines or declares the most common or relevant point at which the associated aspect is likely to be referred or made use of. Choices for visibility include over the air (OTA) versus server. As would be appreciated, "server" would surface on the network side in an application server. However, it is also possible that aspects may be transmitted OTA between one or more application servers.

In the first row of Table 1 above, the opt-in aspect is defined which indicates that the presentity is willing to participate in a given session for a given service or application. As indicated in Table 1, the person is associated with the service.

A second row of Table 1 indicates that a presence aspect is 'available'. This aspect indicates that the presentity is available to communicate using a given service or application and again there is an association between the person and the service.

The next row in Table 1 indicates the presence aspect of contact-means. A presentity's most applicable method of contact for a given service or application is provided and the association is between the person's address and the service.

The next row of Table 1 indicates an aspect of 'contactable'. This aspect shows whether the presentity is willing, available and has currently valid contact means for a given service or application. Again, in this case, the association is between the address of a person and the service.

The next row of Table 1 indicates an aspect of 'reachable'. This shows that the presentity is contactable for a given service or application. A positive indication for reachable shows that a presentity is willing, available, contactable and that their device is in coverage to establish communication over the defined service. The association is therefore between the person, service and the device.

'Where-are-you' is the next aspect defined in Table 1 and shows the presentity's current location. As indicated, the association for this aspect is at the person, and the person, service, and the device.

Other aspects are further defined in Table 1 and include various associations thereto.

Referring again to FIG. 1, a target 110 is shown as a mobile device. As will be appreciated by those in the art, the target could be any device and can include, for example, cellular phones, personal digital assistants, laptop computers, desktop computers, among others. In a presence system, a target 110 is a presentity, in a location system a target 110 is a location target, and in other systems the target 110 could be the entity whose information is sought.

The target 110 communicates over a wireless communication (e.g., cellular) system with a base station 112 in the example of FIG. 1. Specifically, in FIG. 1, target 110 communicates over a wireless communication (e.g., cellular) system with a base station 112, which then communicates with an Internet Protocol network 120 or other network as known to those skilled in the art. As will be appreciated, base station 112 could be a base station for any known wireless communication (e.g., cellular, PCS, iDEN, etc.) service. Further, target 110 could communicate with a network 120 throughout other means such as a short range wireless communication like Bluetooth™, over WiFi or WLAN, through a wired connection such through a USB or Serial port or through a computer modem. Indeed, other means of connecting to network 120 would be known to those skilled in the art.

In the system of FIG. 1, a desktop 114 (e.g., a computing device that is similar or different than target 110) can communicate with a target 110 through a wide area network 118 and network 120. In FIG. 1, desktop 114 can be a target or a watcher in some embodiments.

In the system of FIG. 1, base station 112 further communicates with various other entities including a watcher 130 and a watcher 140. As with target 110, watcher 130 and watcher 140 could be communications devices including cellular phones, personal digital assistants, laptop computers, desktop computers, among others.

Further, watcher 130 or watcher 140 could use a different base station 112 from that of target 110, or could use different network access technologies, including an access point for WiFi or WLAN, a short range or wired communication to a personal computer, among other communication techniques. FIG. 1 is thus merely illustrative.

A presence server, as defined under Open Mobile Alliance (OMA) standards, is shown as presence server 150 in FIG. 1. The presence server 150 communicates over the IP network 120 with the various entities including target 110, watcher 130 and watcher 140.

Further, a location server 160 is shown communicating with presence server 150. In this way, the location server 160 may communicate with the various entities including target 110, watcher 130 and watcher 140 via presence server 150 and network 120. However, the location server 160 may alternatively communicate with the various entities without relaying communications through presence server 150. Thus, the location server 160 may communicate over the IP network 120 with the various entities including target 110, watcher 130 and watcher 140.

Location server 160 could provide location information for a target 110 to various watchers including watcher 130 and watcher 140. The location information could include the location of the target 110 and be provided based on a preferences file that is stored within the location server 160.

In various embodiments, presence information and/or location information may be abstracted through aspects. In this case, an abstraction layer 170 is provided and can communicate with one or both of the presence server 150 and the location server 160.

Further, abstraction layer 170 could directly communicate with target 110, and watchers 130, and 140 in a further embodiment. That is, abstraction layer 170 could be a true front-end to client entities such as target 110, and watchers 130, and 140, and could provide aspects to these entities. The aspects provided could be either based solely on the presence server 150 aspects, location server 160 aspects, or a combination of both presence server 150 aspects and location server 160 aspects. Such aspects could be transported using a PIDF type data format.

In other embodiments, presence server 150 can communicate directly with location server 160, and vice-versa, in order to cooperate or otherwise share information that is stored within the presence server and location server. Thus, in some embodiments, aspects may be specific for presence server 150 or location server 160. Further, in other embodiments aggregation of aspects is possible from one of location server 160 or presence server 150 to the other. The aggregation may be based on combining aspects or raw information as a client from the other peer information owning service.

The use of an abstraction layer 170 allows the downloading or delegation of certain content processing to the abstraction layer. Such an abstraction layer 170 handles the transformation of aspects, while a presence server 150 or location server 160 may still process requests for information from the abstraction layer based on requests received directly from watchers and targets.

Under currently known systems, a presentity or target 110 communicates a preference to the presence server 150 to indicate who may connect to the target 110 and what information can be provided about the target 110. Thus, when a watcher 130 requests to know the presence information for target 110, if the watcher 130 is allowed or authorized to be provided with this information based on pre-specified preferences, the watcher 130 will receive the information in the form of PIDF data composed of various tuples.

Similarly, if watcher 140 is not authorized to receive presence information then a request may be made to presence server 150 which could be denied in various ways according to present Internet Engineering Task Force (IETF) and OMA requirements.

Presence server 150, location server 160, and access layer 170 may be part of any network element, and may form part of a single network element or be distributed among various network elements. The network element will have a communication subsystem to communicate with network 120 to receive and send information (e.g. presence information or location information) and a processor to provide the processing for the aspect transforms. The network element will typically have memory or other computer readable storage medium to store information and processing rules to perform the methods described herein.

Figure 2:
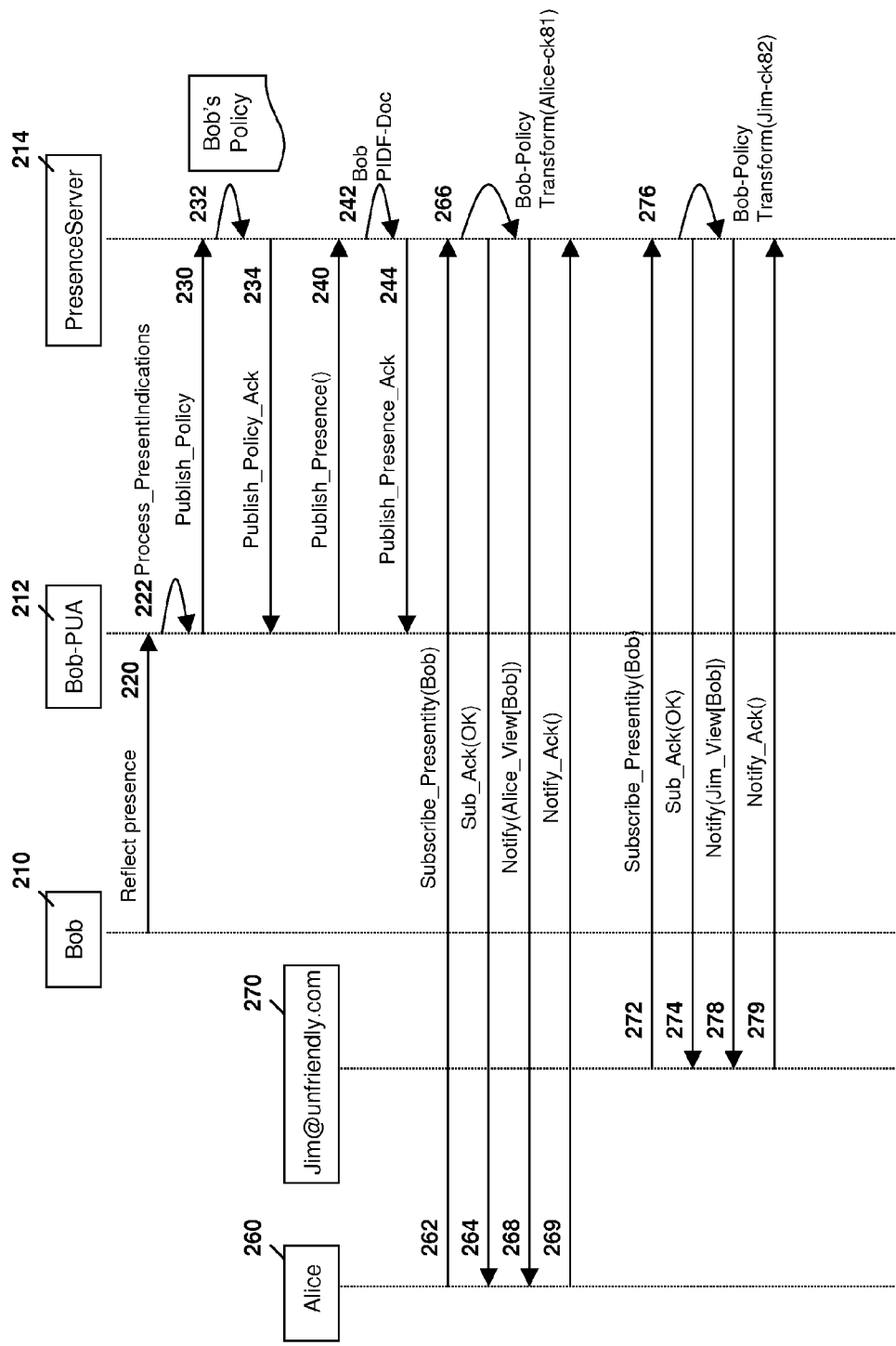
FIG. 2 is a data flow diagram of an exemplary presence system in which both a friendly and unfriendly watcher attempt to subscribe to a target.
Figure 4:
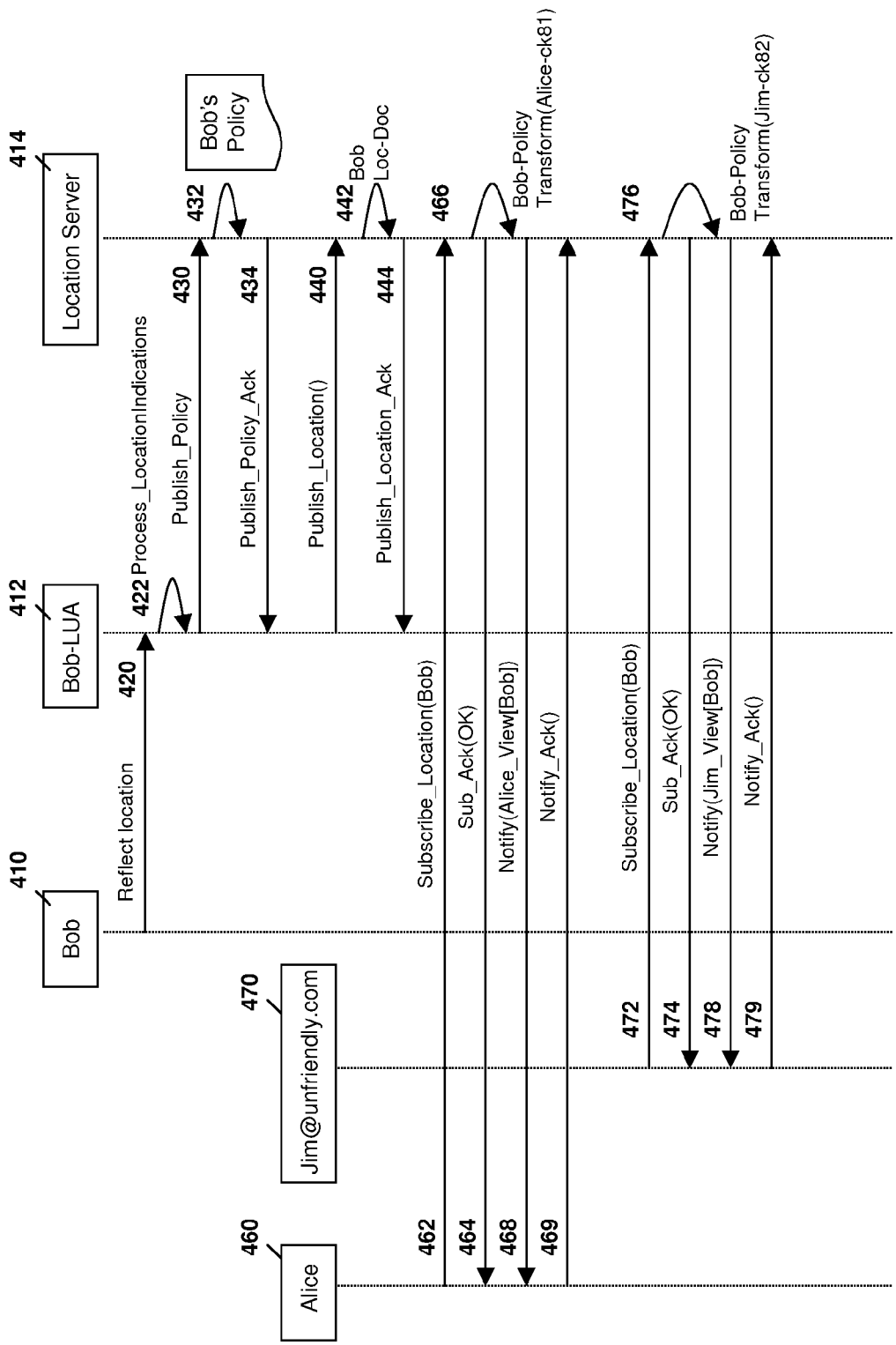
FIG. 4 is a data flow diagram of an exemplary location system in which both a friendly and unfriendly watcher attempt to subscribe to a target.

Reference is now made to FIG. 2, which illustrates an exemplary presence system. An example using location is shown in FIG. 4 below.

In FIG. 2, target (presentity) "Bob" is shown as target 210. The target 210 includes a presence user agent (PUA) 212, which is established to publish presence preferences to a presence server 214.

Target 210 sets preferences in the presence user agent 212. This is shown by line 220, which provides that the presence preferences are reflected in the presence user agent 212. As will be appreciated by those in the art, the user preferences can be set by the manufacturer or the carrier, or they could be set by a user. If set by the user, the user can set the preferences based on, for example, a selection within a menu to indicate which presence aspects can be displayed on their behalf, the class or group of users who have access to the presence information, among other features.

Once the target 210 sets the preferences in the presence user agent 212, user agent 212 processes the information as shown with line 222.

Subsequently, the presence user agent 212 publishes the policy to a presence server 214. The publication of the policy is shown by line 230.

On the server side, once presence server 214 receives a published policy, it processes the published policy, as indicated by line 232 and, if the published policy is acceptable, the presence server 214 responds with an acknowledgement to presence user agent 212, as shown by line 234.

Subsequently, if the presence status of presentity 210 changes, such status being reflected by target 210 toward user agent 212, the presence user agent 212 publishes presence information to presence server 214 as shown by arrow 240.

Presence server 214 then processes the published presence from 240 as shown by arrow 242 and if it is acceptable an acknowledgment is sent, as shown by arrow 244.

Under current systems, the policy sent at line 230 and processed at line 232 would typically have included a standard set of subscription rules specifiers in the form of policy, in which the target 210 has the ability to select which tuples would be returned to an authorized subscriber/watcher when the watcher requested presence information for the target 210. Specifically, OMA PRS defines what are called 'Presence Authorization Rules'. These consist of two component parts: subscription authorization rules and subscription content rules, which together determine (for a target 210) who can subscribe to them, and subsequently what those authorized users are able to see, in terms of presence information. OMA LOCSIP provides similar mechanisms, however the mechanisms are characterized as Location Policies and consist of subscription authorization rules that determine who can subscribe to a target's location information, as well as location content rules which determine what information is disseminated to location clients, assuming the location clients are allowed or accepted to subscribe.

Subsequently, a watcher would receive the permitted tuples, which in the current art includes raw information about a target that needs to be processed by a watcher. As will be appreciated, this requires a high amount of network traffic since all of the tuples need to be returned to the watcher, creating large messages, which the watcher must then process. The further problem with the return of the service tuples to the watcher is that the watcher must then process and interpret the tuples to make a conclusion regarding state associated with target 210. For example, under the presence scenario, various aspects may include those defined in Table 1 for OMA presence. Each of these aspects requires non-trivial processing and a degree of subjectivity that could be interpreted in various ways based on the data that is provided back to the watcher and the manner in which the watcher agent processes the received service tuples.

It will be further appreciated by those in the art that it is undesirable for one watcher to interpret the tuples in a different way then a second watcher. This could result in inconsistencies. This is especially true when the watcher is a particular application on a mobile device and, for interoperability purposes; one application concludes a different aspect using the same tuples as a second application.

The present disclosure provides for the adaptation of presence aspect indications for use as a payload in a PIDF message body. In other words, it is possible to transport, in the body of a session initiation protocol (SIP): NOTIFY, a computed presence aspect on behalf of a presentity.

PIDF has a standard format as defined in the standards under the Internet Engineering Task Force (IETF) request for consultations RFC 3863, Section 4.1.2. A PIDF document requires at least one tuple with the following fields:

A: A mandatory status such as open or closed;
B: Optional communications address (URI only);
C: Other presence mark-up.

Given presence aspects represent a minimal mark-up for a single indication, a PIDF can be repurposed to carry the presence aspect indications. In other words, the PIDF format can be expanded to allow for translation of information to send to a watcher in order to allow the watcher to be provided with uniform aspects.

In one embodiment, the PIDF could contain multiple presence aspects in a single notification.

The modification of the PIDF to provide aspects provides various benefits. First, the use of existing PIDF allows for backward compatibility. In other words, a watcher that is not updated to receive aspects will simply ignore the aspects that are provided in the PIDF document, but will not fail outright due to an unknown presence information payload. Sub-elements that are not understood by the presence watcher client may simply be dropped or ignored.

The present disclosure therefore provides for an upgrade path for updated and enhanced presence aspect aware watcher clients to absorb and directly consume simpler and optimized presence indications. Further, in one embodiment, through the IETF and optionally through the Open Mobile Alliance (OMA), the present method and system allow the embellishment and definition of new metadata in the form of XML elements and attributes for basic PIDF documents and to encapsulate core information as a part of a given presence aspect.

An example of a modified PIDF document includes:

```
<?xml version="1.0" encoding="UTF-8">
<presence xmlns="urn:ietf:params:xml:ns:pidf"
entity="pres:bob@example.com">
  <tuple id="123">
    <reachable> <!-- extension of status sub-element to presence
    markup -->
      <basic>open</basic>
    </reachable>
    <contact priority="0.8">sip:bob@example.com</contact>
  </tuple>
</presence>
```

As indicated in the above XML, the tuple with ID 123 has a reachable aspect with a status of open meaning that the presentity is reachable. The PIDF document returned is potentially much shorter than a similar presence document where the raw information is provided, or a similar document needed to compute or conclude the 'reachable' aspect on behalf of a watcher agent.

In order to be capable of providing the modified PIDF document, the network should be capable of processing the raw data on behalf of the requestor (i.e. watcher). Under the present PIDF standards as defined in IETF RFC 4119, a geopriv <usage-rules> element is defined. The concept of the <usage-rules> could be expanded or extended to create a <pa-transform> which is semantically similar to the <usage-rules> for use a sub element of <transformations> in common policy (as specified in IETF rfc 4745). As will be appreciated, common policy forms the basis for presence authorization rules within an OMA Presence platform. It is therefore possible that the existing policy mechanism used by modern day presence servers such as OMA PRS can establish a dynamically generated PIDF document containing appropriate presence aspects, dynamically, based on the underlying information captured in a presence information store such as a PIDF document.

Similarly, the location information may also be converted into a location aspect option that is combined to form combined presence/location aspects. For example, a LOCSIP location service (LS) will have a similar mechanism to the presence server for subscription and location content rules. This mechanism could use a mechanism similar to the <pa-transform> element in a PRS presence server to provide location aspects on behalf of a location enabled client (e.g. <la-transform>).

An example of the use of a <pa-transform> is provided below.

```
<?xml version="1.0" encoding="UTF-8">
<cr:ruleset xmlns:op="urn:oma:xml:prs:pres-rules"
    xmlns:pr="urn:ietf:params:xml:ns:pres-rules"
    xmlns:cr="urn:ietf:params:xml:ns:common-policy"
    xmlns:pa="urn:oma:xml:prs:pal">
```

-continued

```
<!-- The first method - PresenceServer in-line transform mechanism -->
<cr:rule id="ck81">
  <cr:conditions>
    <cr:identity>
      <!-- Matches on watcher 'Alice' -->
      <cr:one id="sip:alice@example.com"/>
    </cr:identity>
  </cr:conditions>
  <cr:actions>
    <!-- Allow proposed-watcher 'Alice' to subscribe -->
    <pr:sub-handling>allow</pr:sub-handling>
  </cr:actions>
  <cr:transformations>
    <!-- Here is where we transform or produce a presence
    aspect. -->
    <pa:pa-transform>
      <!--
      The following example is an in-line presence aspect
      transformation using XQuery.
      -->
      <![CDATA[
      xquery version "1.0";
      declare default element
        namespace "urn:ietf:params:xml:ns:pidf";
        for $u in collection("pidf-manipulation/users")
          where ($u/presence[@entity="bob@example.com"])
            return {$u/presence}...
      ]]>
    </pa:pa-transform>
  </cr:transformations>
</cr:rule>
<!--
  The second method - PresenceServer makes use of an indirect
  mechanism (e.g. Presence Access Layer PAL)
-->
<cr:rule id="ck82">
  <cr:conditions>
    <cr:identity>
      <!-- Matches on anything from 'nonfriends.com' -->
      <cr:many domain="unfriendly.com"/>
    </cr:identity>
  </cr:conditions>
  <cr:actions>
    <!-- Polite block proposed-watcher(s) -->
    <pr:sub-handling>polite-block</pr:sub-handling>
  </cr:actions>
  <cr:transformations>
    <!-- Here is where we invoke PAL aspect. -->
    <pa:pa-transform>
      <!-
      PAL Polite block transform is an indirect mechanism for
      Invoking a specific presence aspect in PAL. Another option
      would be to invoke PAL directly (e.g. using an inline
      SOAP or XML-RPC call.
      -->
      <pa:invoke-polite-block-transformation/>
    </pa:pa-transform>
  </cr:rule>
</cr:ruleset>
```

The above is provided in a policy document by a target such as target 210 from FIG. 2. In the policy document, various presence authorization rules are defined and in particular the rules are provided as "ck81" and "ck82" where each rule has three elements. The first element is a condition, which indicates when the rule should be applied. The second element is an action that should occur if the conditions are met, and the third element is a transformation that can occur based on data regarding the target 210. It is the third element that is used to provide or project the resulting presence information toward the watcher, and where the presence aspects may be computed, either directly or indirectly.

Thus, for rule "ck81" the condition expressed is that the watcher is a particular person. As will be appreciated, this is a very simple example in which a particular watcher is identified. In other examples, groups of watchers could be allowed based on, for example, an address book within a target 210 device. Other options include a checklist of who would be allowed to certain information or based on certain rules or to have various groupings of users to which rules apply. For example, if the co-workers of target 210 need to have a rule applied then this rule could be applied to a class of users.

In the example code above, rule "ck81" conditionally applies only to the particular watcher "Alice" through public user identity 'sip:alice@example.com'.

The action taken based on a successful match for the condition of rule "ck81" is that "Alice" is allowed to be a watcher of target 210.

The transformation that occurs in the case of the "ck81" rule provides the processing to return various presence aspects for target "Bob" to watcher "Alice". Thus, the presence server utilizes in-line code (within the transform clause) to determine whether for example the target 210 is reachable and returns the presence aspect such as that described in the SIP:NOTIFY above, where the notify included that the reachability of target 210 was "open".

The second rule defined in the policy above indicates that the conditions are that the watcher has a domain of "unfriendly.com". In this case, the target does not want presence information provided to a watcher originating from this domain, and the action defined under the rule is to provide the requestor with a "polite block". As defined under the OMA standards, a polite block denies a watcher from receiving presence information while indicating (to the same watcher) that the subscription is still active.

Referring again to FIG. 2, the communication between the PUA 212 and the presence server 214, as shown by arrow 230, provides the publication of the policy from the target 210. This includes the provision of presence authorization rules to the presence server 214 which allows presence server 214 to process the rules when a watcher, such as watcher 260 or watcher 270 make a request to presence server 214 to watch or otherwise observe target 210. In this case, the policy as processed at line 232 reflects the rules submitted by the target 210.

Further, presence information about the target 210 is published to the presence server as shown by lines 240 and 242.

In the example of FIG. 2, watcher 260 is a friendly interested observer, and in this case is watcher "Alice". In this case, the watcher 260 subscribes to the target 210 by making a request to presence server 214. This is shown by arrow 262. In response, processing, as shown by arrow 266 is carried out. The processing applies presence authorization rules to establish subscription authorization (either accept, reject, block, polite-block). In the case of FIG. 2, where two rules exist, the processing requires a check of the conditions for each rule. Here watcher 260 is "Alice", and thus matches the conditions of rule ck81, but does not meet the conditions of rule ck82. As a result, presence server 214 sends an acknowledgment with authorization 264 to the watcher 260.

Subsequently, the presence server 214 continues processing the subscription request based on the corresponding subscription content rule of target 210 relative to watcher 260, and in this case transforms the request as shown by arrow 266, which provides for a notification 268 to watcher 260.

The further processing, shown by arrow 266, causes the presence server 214 to process presence authorization rules in the policy of line 232. The transformation of rule ck81 is invoked, and a resulting notification 268 is sent to watcher 260. The transformation (as part of subscription content rules) includes the processing and return of various presence aspects as notification 268.

In response to receiving notification 268, watcher 260 sends an acknowledgment 269 back to presence server 214.

In other embodiments, notification 268 could be sent in response to the target 210 changing information. In this case the notification is not a result of a watcher subscribing to the information, but rather based on the target being updated.

Notification 268 is much shorter then a similar notification under traditional PIDF communications. Specifically, the notification under traditional PIDF specifications would include information tuples including various notes. These traditional PIDF messages are very "chatty" and require significant information passing between the presence server 214 and the watcher 260. The "chatty messages also consume memory and processing on the mobile device, require the radio to be on for a longer period, and thus negatively affect battery, CPU, and memory resources on a mobile device.

Conversely, the notification 268 provides basic notification including whether or not the various aspects are "open" or "closed" to indicate to watcher 260 the various presence aspects. Thus, as seen above with reference to the reachability aspect XML, very short concise message can be sent to watcher 260 to ensure that the watcher receives consistent, network friendly notifications about the presence state of target 210.

In FIG. 2, a further watcher 270 requests presence information about target 210. In this regard, the watcher 270 sends a subscription request to presence server 214 as shown by arrow 272 and receives an acknowledgment 274 back. As indicated by arrow 276, the watcher 270 falls within the conditions of rule "ck82" (i.e. the requestor originates from an unfriendly domain), and the action specified within the policy is a polite block from target 210. Processing includes a transform within the policy to provide the polite block in a SIP:Notify.

In the case of FIG. 2, the processing is done at presence server 214 and the logic for the polite block is provided within a transformation that is part of the presence server processing server transformation. The transformation would therefore occur at line 276 and a notification 278 is sent to watcher 270. In this case, the notification for a polite block indicates that a legitimate looking presence response should be sent to watcher 270 but that no real information associated with target 210 is provided to watcher 270.

In response, watcher 270 sends an acknowledgment 279 to presence server 214.

FIG. 2 provides a presence system that allows for processing at presence server 214 to ensure that consistent OMA presence aspects are derived and returned to a watcher 260 or watcher 270. Further, the signaling over a network is reduced since the raw information does not need to be provided to watcher 260 or watcher 270 but rather that the presence aspects are provided as an extension to the tradition PIDF. The policy itself is published by the target and includes, likely inherently the rules that are to be applied to a particular watchers or category of watchers.

In a further embodiment, a watcher 260 can submit a subscription with an event notification filter specification. This could be, for example, an attachment or in-line body supplied to the presence server 214 during the subscription. The presence server 214 uses criteria in the 'filter' to narrow what is notified or sent to the watcher. Thus, a target 210 publishes a transform as part of its policy, while watcher 260 also indirectly provides a 'narrowing specification' or transform using the event notify filter mechanism. The two specifications (i.e. presentity policy and event notify filter) are then combined to provide an outcome (or result) that is consumable as a presence aspect by a watcher client.

In an alternative embodiment, the processing can be delegated away from presence server 214 and to an abstraction layer such as abstraction layer 170 from FIG. 1.

Figure 3:
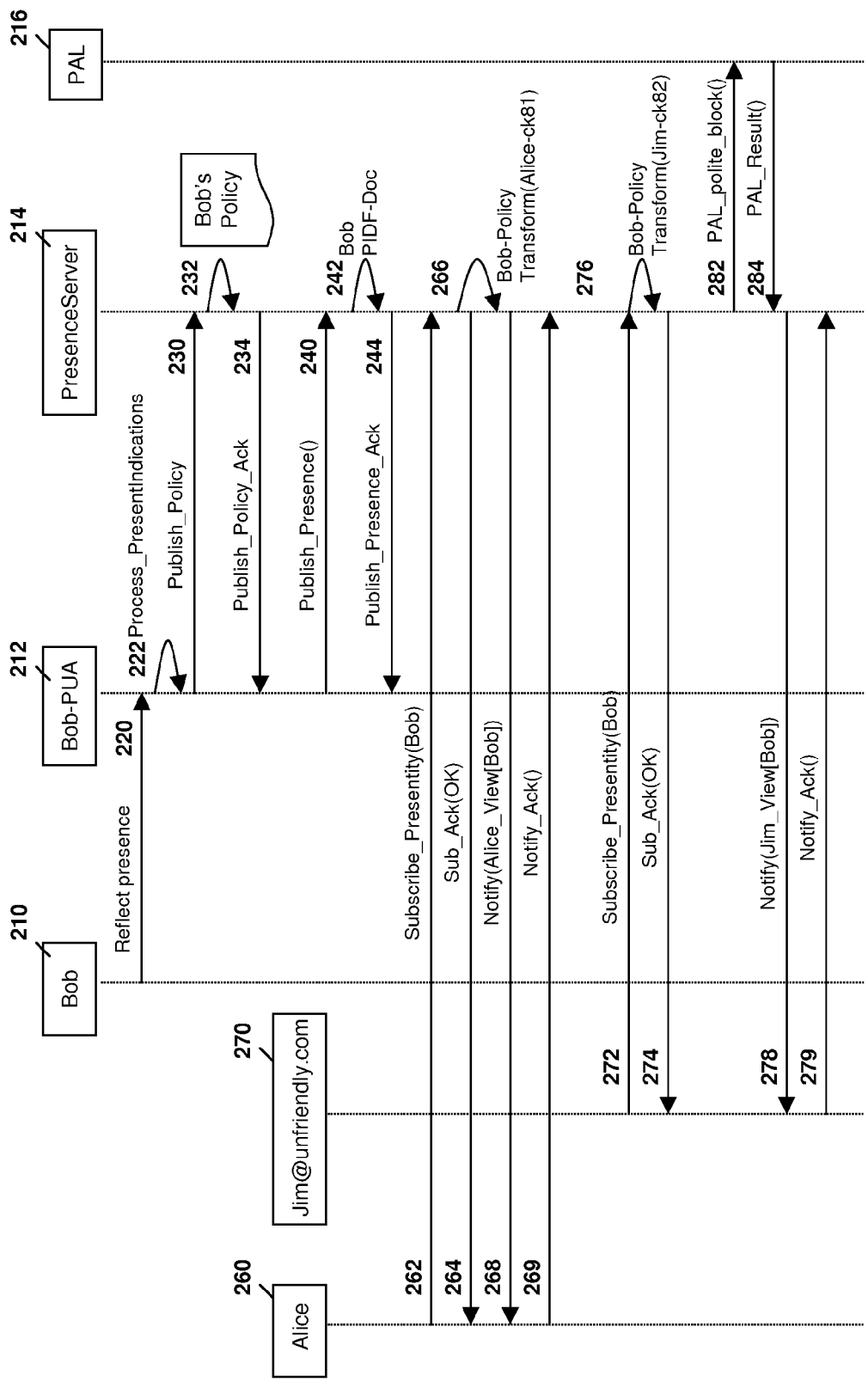
FIG. 3 is the data flow diagram of FIG. 2 in which an abstraction layer has been added.

Reference is now made to FIG. 3. In FIG. 3, similar reference numerals to those of FIG. 3 are utilized. However, a presence access layer 216 is added in which the processing of various policies or transformations are delegated.

In particular, in response to the transformation of arrow 276, request is made to the access layer 216 to process the requirements for a polite block. This is shown by arrow 282. In response, the result is returned as shown by arrow 284. The notification 278 then utilizes the results from the access layer 216 to provide this information to watcher 270.

The use of the access layer 216 alleviates the processing burden of presence server 214 and provides a separation of concerns as will be appreciated by those skilled in the art. Further, with the access layer 216 it may be possible to incorporate presence information with data from other services such as location. This results in a more accurate reflection, depending on application logic or rules. In addition to invoking the access layer 216 or evaluating common XML transform elements, which provide invocation towards the access layer 216, it is also possible to use the results of a transform as an input or parameter to the access layer 216 in the computation of one or more presence aspects on behalf of a watcher consuming PIDF documents for a given presentity or target 210. For example, the resolution of one or more policy rules can result in a transformed PIDF document which is the result of the access layer 216 presence aspects computed using inputs derived as part of the common-policy evaluation/transformation process itself.

In an alternative to the embodiment of FIG. 3, a watcher could also provide an event notification filter. The filter could be a specification of rules. The subscription filter could also be an indirect way for the watcher 260 to establish policy or parameters on how to go about narrowing down or guiding the presence server 214 or access layer 216 on how they should evaluate underlying information for that particular watcher client.

For example, in addition to the subscription request, the filter could specify OptInSrc or UndefWillingness' policy type/values as part of a subscription filter. As will be appreciated, the filtering mechanism is part of IETF rfc-4660/rfc-4661 but is also supported by OMA PRS.

Reference is now made to FIG. 4. FIG. 4 is similar to FIG. 2, with the exception that FIG. 4 includes a location server rather than a presence server.

A location target 410 includes a location user agent 412. The location user agent is utilized to communicate with a location server 414 and provide location and policy updates.

Various policies are specified from location target 410 within the location user agent (LUA) 412, as shown by line 420. When the policies are provided to location user agent 412, the location user agent 412 then processes the policies, as shown by line 422, and the resulting location policies are published to location server 414 as shown by line 430.

Location server 414 processes the location policy, as shown by line 432 and further acknowledges receiving the policy, as shown by line 434.

If a location status changes, as reflected by a target 410 on user agent 412, the location user agent 412 will further provide location updates to location server 414, as shown by line 440. Location server 414 then processes the location, as shown by line 442, and further acknowledges the location, as shown by line 444.

A watcher 460 subscribes to receiving location information about location target 410 by sending a subscription message, as shown by line 462, to location server 414. Location server 414 processes the subscription request, as shown by line 466, and then acknowledges with authorization the subscription request, shown by line 464. The processing shown by line 466 executes applicable location-content-rule(s) in the form of a transform on behalf of target 410 ('Bob') toward watcher 460 ('Alice').

The processing shown by line 466 further involves the use of location content rules similarly to the processing at 266 from FIG. 2. Specifically, a location document similar to the PIDF rules document is utilized to determine what the watcher 460 is allowed to receive and further what location information should be provided back to the watcher 460. In this case, a transformation to provide location aspects to the watcher can be performed at location server 414 (or at an access layer, not shown).

Based on the processing, as seen at line 466, a notification is sent to watcher 460 providing the location aspects required by watcher 460, as seen at line 468. Location watcher 460 acknowledges this notification, as seen at line 469.

Similarly, an unfriendly watcher 470 subscribes to location target 410, as seen at line 472. In this case, location server 414 responds with an acknowledgment, as seen at line 474, and processes the request, as seen at line 476. In other embodiments, line 474 may represent a negative acknowledgement, especially if a polite block is not supported.

The processing seen at line 476 determines that a location rule for the unfriendly watcher needs to be applied. Similarly to the processing at line 276 from FIG. 2, a polite rejection can be sent. This is done with the notification as seen at line 478, which is then acknowledged by watcher 470 as seen at line 479.

FIG. 4 therefore illustrates the alternative embodiment in which a location server is utilized rather than a presence server. The concepts illustrated in FIG. 4 could also be abstracted to a generalized server providing aspects to a watcher. Further, as with FIG. 3 an access layer (e.g. a location access layer) could be utilized to remove processing from location server 414. The access layer could also have the advantage of providing processing for systems in which both a location server and presence server exist, thereby cross-referencing data.

In the present embodiment, a presence server 214, or a location server 414, typically evaluate policy during a subscription request from a watcher and/or when sending a notification as part of an existing subscription. Thus, the evaluation can occur when sending a notification, for example, as part of an existing subscription as a part of subscription content authorization.

It is further possible to provide additional directives and/or policies within the common policy actions and/or transformation portion of the policy document associated with the target 210 to further refine or augment the behavior. For example, directives which specify evaluation or retention strategies on behalf of interested observers or watchers 260 or 270 through sub-elements of the transform elements may be applied at the policy evaluation or policy transformation re-execution stages.

If the target or watcher is a mobile device, any mobile device can be used. One exemplary mobile device is illustrated with reference to FIG. 5.

Figure 5:
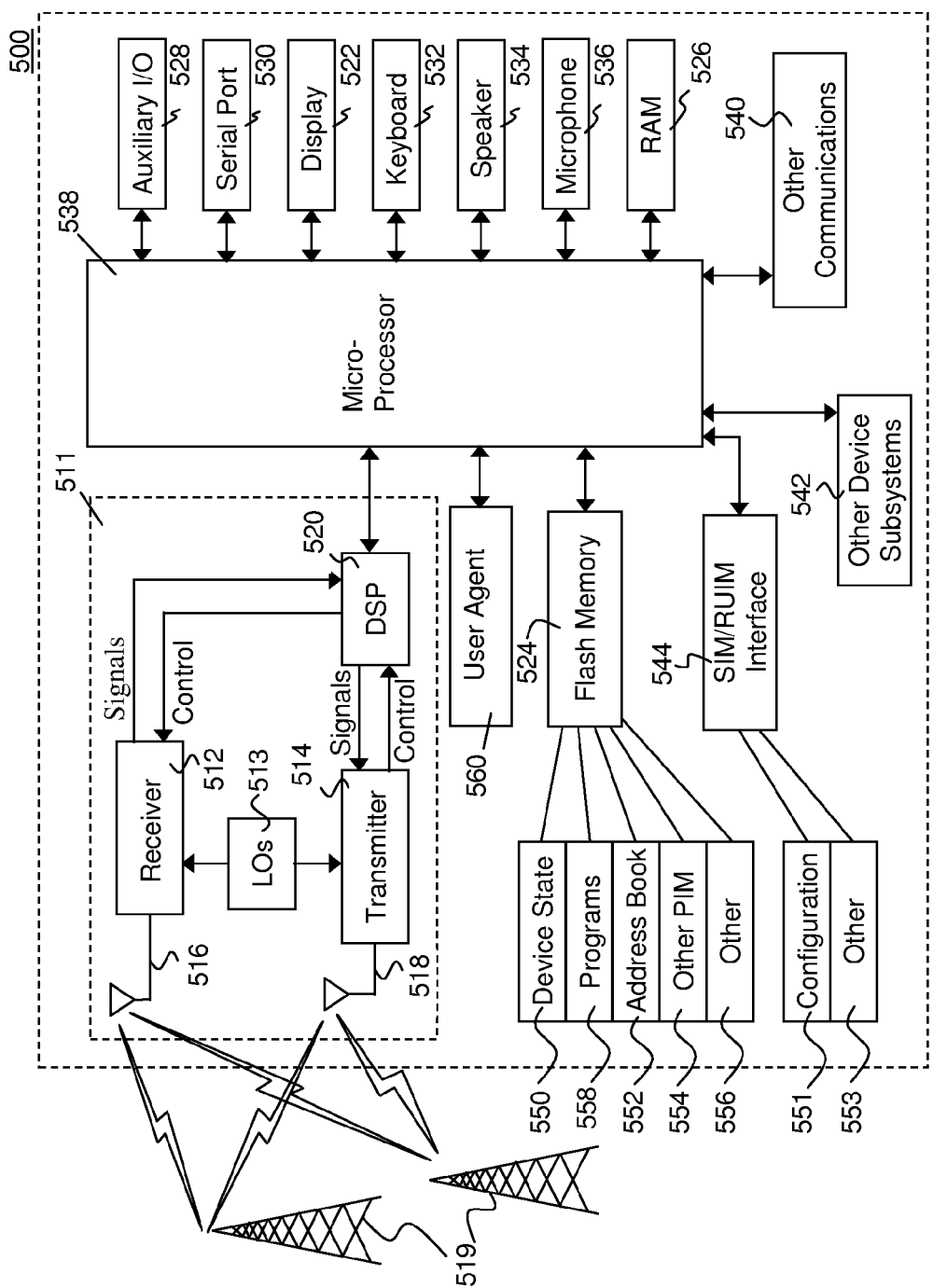
FIG. 5 is a block diagram of an exemplary mobile device capable of being used as a watcher or a target for the present systems and methods.

FIG. 5 is a block diagram illustrating a mobile device for use with various embodiments of the apparatus and method of the present application. Mobile device 500 may be a two-way wireless communication device having voice and data communication capabilities. Mobile device 500 may include the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, user equipment (UE), mobile station, or a data communication device, as examples.

Where mobile device 500 is enabled for two-way communication, it may incorporate a communication subsystem 511, including both a receiver 512 and a transmitter 514, as well as associated components such as one or more, embedded or internal, antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the device is intended to operate.

Network access requirements will also vary depending upon the type of network 519. In some networks network access is associated with a subscriber or user of mobile station 500. A mobile station may require a removable user identity module (RUIM) or a subscriber identity module (SIM) card in order to operate on a network. The SIM/RUIM interface 544 is normally similar to a card-slot into which a SIM/RUIM card can be inserted and ejected like a diskette or PCMCIA card. The SIM/RUIM card can have approximately 64K of memory and hold many key configuration 551, and other information 553 such as identification, and subscriber related information.

When network registration or activation procedures have been completed, mobile station 500 may send and receive communication signals over the network 519. As illustrated in FIG. 5, network 519 may include multiple base stations communicating with the mobile device. For example, in a hybrid CDMA 1x EVDO system, a CDMA base station and an EVDO base station communicate with the mobile station and the mobile station is connected to both simultaneously. The EVDO and CDMA 1x base stations use different paging slots to communicate with the mobile device. Other systems such as long term evolution (LTE) or long term evolution-advance (LTE-A) may use multiple input multiple output (MIMO) to communicate with a plurality of base stations.

Signals received by antenna 516 through communication network 519 are input to receiver 512, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog conversion, frequency up conversion, filtering, amplification and transmission over the communication network 519 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile device 500 includes a control module such as microprocessor 538 which controls the overall operation of the device. Communication functions, including at least data and voice communications, are performed through communication subsystem 511. Microprocessor 538 also interacts with further device subsystems such as the display 522, flash memory 524, random access memory (RAM) 526, auxiliary input/output (I/O) subsystems 528, serial port 530, one or more keyboards or keypads 532, speaker 534, microphone 536, other communication subsystem 540 such as a short-range or long-range (for example WiFi or WiMax) communications subsystem and any other device subsystems generally designated as 542. Serial port 530 could include a USB port or other port known to those in the art.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the microprocessor 538 may be stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. Microprocessor 538, in addition to its operating system functions, executes software applications that are loaded or otherwise stored on the mobile station. A predetermined set of applications that control basic operations, including data and voice communication applications for example, may be installed on mobile device 500 during manufacturing. Other applications could be installed subsequently or dynamically.

One software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would generally have the ability to send and receive data items, via the wireless network 519. In one embodiment, the PIM data items are seamlessly integrated, synchronized and updated, via the wireless network 519, with the mobile station user's corresponding data items stored or associated with a host computer system. Further applications may also be loaded onto the mobile device 500 through the network 519, an auxiliary I/O subsystem 528, serial port 530, short-range or long-range communications subsystem 540 or any other suitable subsystem 542, and installed by a user in the RAM 526 or a non-volatile store (not shown) for execution by the microprocessor 538. Such flexibility in application installation increases the functionality of the device and may provide enhanced on-device functions, communication-related functions, or both. For example, secure communication applications may enable electronic commerce functions and other such financial transactions to be performed using the mobile device 500.

In a data communication mode, a received signal such as a text message or web page download will be processed by the communication subsystem 511 and input to the microprocessor 538, which may further process the received signal for output to the display 522, or alternatively to an auxiliary I/O device 528.

A user of mobile station 500 may also compose data items such as email messages for example, using the keyboard 532, which may be a complete alphanumeric keyboard or telephone-type keypad, in conjunction with the display 522 and possibly an auxiliary I/O device 528. Such composed items may then be transmitted over a communication network through the communication subsystem 511.

A user agent 560 could be the presence user agent 212 from FIGS. 2 and 3 or location user agent 412 from FIG. 4. In alternative embodiments, instead of user agent 560, a dedicated watcher agent could be used. In further alternatives, an agent combining a user agent and a watcher agent could be utilized.

For voice communications, overall operation of mobile device 500 is similar, except that received signals would preferably be output to a speaker 534 and signals for transmission would be generated by a microphone 536. Alternative voice or audio I/O subsystems, such as a voice message recording subsystem, may also be implemented on mobile device 500. Although voice or audio signal output is typically accomplished primarily through the speaker 534, display 522 may also be used to provide an indication of the identity of a calling party, the duration of a voice call, or other voice call related information for example.

Serial port 530 in FIG. 5, may be implemented in a personal digital assistant (PDA)-type mobile device for which synchronization with a user's desktop computer (not shown) may be desirable, but is an optional device component. Such a port 530 would enable a user to set preferences through an external device or software application and would extend the capabilities of mobile device 500 by providing for information or software downloads to mobile device 500 other than through a wireless communication network. The alternate download path may for example be used to load an encryption key onto the device through a direct and thus reliable and trusted connection to thereby enable secure device communication. As will be appreciated by those skilled in the art, serial port 530 can further be used to connect the mobile device to a computer to act as a modem.

Other communications subsystems 540, such as a short-range or long-range communications subsystem, is a further optional component which may provide for communication between mobile station 500 and different systems or devices, which need not necessarily be similar devices. For example, the subsystem 540 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for processing a data request from a watcher for a target at a server comprising:
receiving, at the server, a request for presence information of the target from the watcher, via a network;
searching, based on the request from the watcher, through authorization rules for rules to be applied based on the watcher;
applying at least one rule from the searching step in response to said watcher request, the rule causing a transformation of the information into at least one presence aspect of the target interpretable by the watcher, the applying utilizing a presence information data format transformation, comprising aggregating multiple aspects, and wherein the information requested by the watcher is transformed from raw presence information prior to being transmitted; and
returning, from the server to the watcher, the at least one presence aspect of the target incorporated in a presence information data format via the network.

2. The method of claim 1, wherein the request for information is a subscription request.

3. The method of claim 1, wherein the authorization rules are predetermined based on a user setting.

4. The method of claim 1, wherein the information is location information.

5. The method of claim 1, wherein the applying comprises invoking an access layer to process the transformation.

6. The method of claim 5, wherein the returning is performed by the access layer.

7. The method of claim wherein the access layer combines aspects from multiple servers.

8. The method of claim 1, wherein the at least one aspect is an aspect defined by the Open Mobile Alliance.

9. The method of claim 1, wherein returning comprises utilizing a presence information data format having sub-elements for the aspects.

10. The method of claim 9, wherein the sub-elements can be ignored by the watcher if not recognized by the watcher.

11. The method of claim 1, wherein the applying further utilizes a filter from the watcher.

12. A tangible, non-transitory computer readable medium storing a program code which when executed by a processor of a computing device causes said computing device to perform the method of claim 1.

13. A network element configured for processing a data request from a watcher for a target, the network element comprising:
a processor; and
a communication subsystem,
the processor and the communication subsystem cooperating for:
receiving a request for presence information of the target from the watcher via a network;
searching, based on the request from the watcher, through authorization rules for rules to be applied based on the watcher;
applying at least one rule from the searching step in response to said watcher request, the rule causing a transformation of the information into at least one presence aspect of the target interpretable by the watcher, the applying utilizing a presence information data format transformation, comprising aggregating multiple aspects, and wherein the information requested by the watcher is transformed from raw presence information prior to being transmitted; and
returning the at least one presence aspect of the target incorporated in a presence information data format.

14. The network element of claim 13, wherein the network element comprises at least one of a location server and a presence server.

15. The network element of claim 13, further comprising an access layer to process the transformation.

16. The network element of claim 15, wherein the access layer is configured to aggregate aspects from a presence server and a location server.

* * * * *